United States Patent
Gould

(10) Patent No.: US 11,303,822 B2
(45) Date of Patent: Apr. 12, 2022

(54) VEHICLE IMAGING APPARATUS

(71) Applicant: Degould Limited, Exeter (GB)

(72) Inventor: Daniel George Gould, Exeter (GB)

(73) Assignee: Degould Limited, Exeter (GB)

( * ) Notice: Subject to any disclaimer, the term of this patent is extended or adjusted under 35 U.S.C. 154(b) by 322 days.

(21) Appl. No.: 16/613,880

(22) PCT Filed: May 14, 2018

(86) PCT No.: PCT/GB2018/051301
§ 371 (c)(1),
(2) Date: Nov. 15, 2019

(87) PCT Pub. No.: WO2018/211251
PCT Pub. Date: Nov. 22, 2018

(65) Prior Publication Data
US 2020/0084393 A1    Mar. 12, 2020

(30) Foreign Application Priority Data

May 18, 2017    (GB) ..................................... 1707968

(51) Int. Cl.
*G06K 9/00*    (2006.01)
*H04N 5/247*    (2006.01)
(Continued)

(52) U.S. Cl.
CPC .............. *H04N 5/247* (2013.01); *G03B 15/00* (2013.01); *G06T 7/0002* (2013.01);
(Continued)

(58) Field of Classification Search
CPC ......... G01C 11/04; G06T 7/70; G06T 7/0051; G01S 17/89; G02J 3/2823; G06K 9/6269;
(Continued)

(56) References Cited

U.S. PATENT DOCUMENTS

2011/0050929 A1    3/2011    Lee
2011/0109748 A1*   5/2011    Lee .......................... G01S 17/87
                                                                  348/159
(Continued)

FOREIGN PATENT DOCUMENTS

CA    2326087 A1    5/2002
CA    2429236 A1    5/2002
(Continued)

OTHER PUBLICATIONS

International Search Report and Written Opinion issued in connection with International Application No. PCT/3B2018/051301 dated Jul. 19, 2018.

(Continued)

*Primary Examiner* — Phuoc H Doan
(74) *Attorney, Agent, or Firm* — Womble Bond Dickinson (US) LLP; John J. Penny, Jr.

(57) ABSTRACT

A vehicle imaging station comprising one or more cameras each camera having an adjustable shutter speed and a field of view, the fields of view of the one or more cameras covering an vehicle imaging volume, a control unit arranged to control the shutter speed of the cameras, a vehicle speed detection device arranged to measure the speed of a vehicle moving through the vehicle imaging volume and to output detected vehicle speed data to the control unit. The control unit is arranged to automatically adjust the shutter speed of the cameras based on the detected vehicle speed data and to cause the cameras to capture one or more images with the adjusted shutter speed.

10 Claims, 3 Drawing Sheets

(51) Int. Cl.
   *H04N 5/232*   (2006.01)
   *G03B 15/00*   (2021.01)
   *G06T 7/00*    (2017.01)
   *H04N 5/225*   (2006.01)

(52) U.S. Cl.
   CPC ....... *H04N 5/2253* (2013.01); *H04N 5/23218* (2018.08); *G06T 2207/30248* (2013.01)

(58) Field of Classification Search
   CPC .. G06K 9/4652; G06K 9/4604; G06K 9/4661; G06K 9/52; H04N 5/2256; H04N 9/045; H04N 7/18; H04N 5/33
   See application file for complete search history.

(56) References Cited

U.S. PATENT DOCUMENTS

| | | | |
|---|---|---|---|
| 2015/0097924 A1* | 4/2015 | Hauk | G03B 37/02 348/36 |
| 2016/0100087 A1 | 4/2016 | Scheich | |

FOREIGN PATENT DOCUMENTS

| | | |
|---|---|---|
| CN | 105323572 A | 2/2016 |
| EP | 1035510 A2 | 9/2000 |
| GB | 2253761 A | 9/1992 |
| GB | 2500716 A | 10/2013 |
| JP | H01218272 A | 8/1989 |
| JP | H01218273 A | 8/1989 |
| JP | H02214830 A | 8/1990 |
| JP | H04185579 A | 7/1992 |
| KR | 20160040039 A | 4/2016 |
| KR | 101625538 B1 | 6/2016 |
| TW | 201603557 A | 1/2016 |

OTHER PUBLICATIONS

Examination Report Under Section 18(3) issued in connection with International Application No. GB1707968.2 dated Nov. 9, 2017.
Search Report Under Section 17 issued in connection with International Application No. GB1707968.2 dated Nov. 8, 2017.
Examination Report Under Section 18(3) issued in connection with International Application No. GB1707968.2 dated Jan. 23, 2018.
Further Search Report Under Section 17 issued in connection with International Application No. GB1707968.2 dated Jan. 22, 2018.

* cited by examiner

VEHICLE IMAGING APPARATUS

The present application claims priority under 35 U.S.C. § 119 to Great Britain Application No. 1707968.2 filed on May 18, 2017, and under 35 U.S.C. § 365 to International Application No. PCT/GB2018/051301 filed on May 14, 2018. The entire contents of these applications are incorporated herein by reference in their entirety.

FIELD OF THE INVENTION

This invention relates to the imaging of vehicles.

BACKGROUND TO THE INVENTION

Over time vehicles may suffer external damage, such as scratches and dents, or structural damage. Current methods of assessment of this damage involve manual inspection and recording of the location and nature of visible surface damage. Manual damage inspection is a time consuming process which is susceptible to human error.

SUMMARY OF THE INVENTION

According to a first aspect of the invention there is provided a vehicle imaging station comprising:
one or more cameras, each camera having an adjustable shutter speed and a field of view, the fields of view of the one or more cameras covering an vehicle imaging volume;
a control unit arranged to control the shutter speed of the cameras,
a vehicle speed detection device arranged to measure the speed of a vehicle moving through the vehicle imaging volume and to output detected vehicle speed data to the control unit,
wherein the control unit is arranged to automatically adjust the shutter speed of the cameras based on the detected vehicle speed data and to cause the cameras to capture one or more images with the adjusted shutter speed.

Thus the invention enables a fast but accurate way of imaging a vehicle, for example for recording the nature and location of visible damage to vehicles. This system enables capture of images for damage assessment of vehicles while the vehicle is on the move, which increases the speed of the process as well as making the system easier to use for a driver of the vehicle to be assessed because there is no need to stop the vehicle during imaging. Adjusting the shutter speed of the cameras automatically based on the detected speed of the vehicle ensures that the quality of the images that are obtained is optimised.

The apparatus may further comprises a light monitoring device including one or more light meters positioned around the vehicle imaging volume.

The control unit may be arranged to take into account light level data when adjusting the shutter speed, in addition to detected vehicle speed data.

The control unit can additionally be arranged to automatically adjust the field of view of the one or more cameras based on the adjusted shutter speed and/or a detected light level within the vehicle imaging volume.

The control unit can additionally be arranged to automatically adjust the ISO (international standards organisation) setting of the one or more cameras based on the adjusted shutter speed and/or a detected light level within the vehicle imaging volume.

Thus the imaging station can be arranged to adjust the ISO, field of view and the shutter speed together to optimise the camera settings to improve the quality of the images captured of a vehicle having a particular speed and taking into account the light level within the vehicle imaging volume.

The vehicle speed detection device may be arranged to monitor the speed of the vehicle at multiple points in the vehicle imaging volume and the control unit may be arranged to dynamically adjust the shutter speed of the cameras accordingly.

The vehicle speed detection device may be arranged to continuously monitor the speed of the vehicle as the vehicle passes through the vehicle imaging volume and the control unit may be arranged to continuously update the shutter speed of the one or more cameras as the vehicle passes through the vehicle imaging volume.

Thus even if the speed of the vehicle changes as it passes through the vehicle imaging volume, the shutter speeds of the one or more cameras will still be adjusted appropriately.

The image capture devices may be mounted on one or more upright supports.

The vehicle speed detection device may be a laser based system. It is preferred that the vehicle speed detection device comprises a laser scanner including a mirror that can be moved to move the laser beam.

An advantage of such systems is that this enables the speed of a vehicle to be measured while the vehicle is moving towards the system and also while the vehicle is moving away from the system.

The vehicle imaging station may include a vehicle length and/or height detection device and the control unit can cause the camera(s) to adjust the number of images captured depending on a detected length and/or height of the vehicle.

Thus a greater number of images can be captured for longer vehicles and less images can be captured for shorter vehicles.

The one or more cameras can be arranged to capture a minimum of at least three but more preferably four images of a relatively short vehicle (for example an average sized car), but may be arranged to capture six or more images of a longer vehicle such as a bus.

A single laser based system may be used for both the vehicle length detection device and the vehicle speed detection device.

The one or more cameras may be mounted on one or more support posts.

The vehicle imaging station may include a booth within which the one or more image capture devices are provided and which has an entrance and an exit for a vehicle.

Locating the image capture devices in a booth can reduce unwanted light interference in the captured images.

The apparatus may further comprises a unique identifier capture system (UICS) for capturing and processing images of unique identifiers associated with vehicle being imaged by the apparatus.

If the image capture devices are located within a booth, at least a portion of the walls of the booth may include a light absorption coating or an antireflection coating.

The apparatus may further comprise one or more light emitting devices for illuminating the vehicle imaging volume.

The light monitoring device may receive light level data from the light meters and adjust the output power of one or more of the light emitting devices depending on the received light level data.

Thus, the light level over the body of the vehicle can be kept constant and even in order to avoid light and dark spots over the vehicle body which may otherwise hide surface imperfections and/or damage.

If the image capture devices are located within a booth, the booth may comprise automatic doors at each end, arranged to open to enable the vehicle to pass in to the booth, to close automatically once the vehicle has entered the booth and to open again to enable the vehicle to exit the booth.

Thus the apparatus is arranged to block out light interference from outside the booth which improves the quality of the images captured.

The plurality of cameras can comprise two sets of cameras arranged to be located on either side of the path of the vehicle to be imaged, wherein each array comprises two or more cameras.

According to a second aspect of the invention there is provided a camera array for imaging a vehicle, the camera array comprising first and second support structures located on either side of a vehicle imaging volume, first and second cameras attached to the first support structure, wherein the first camera is located at a first height and is angled to capture an image of a front of a vehicle as it enters the vehicle imaging volume, and the second camera is located at a second height, greater than the first height and is angled to capture an image of a rear of a vehicle as it exits the vehicle imaging volume second and third cameras attached to the second support structure wherein the third camera is located at the first height and is angled to capture the front of a vehicle as it enters the vehicle imaging volume.

There can be an angle of between 0° and 180° between the first and second cameras and between the third and fourth cameras.

The first height can be between 0.6 m and 1 m.

The second height can be between 1 m and 1.5 m

Thus the respective heights and angles of the cameras enable a substantial part of the bodywork of a vehicle passing through the vehicle imaging volume to be captured whilst minimising the number of cameras required.

The camera array can additionally include a fourth camera located at a third height. The third height can be between 1.5 m and 2 m.

The camera array can additionally include a further support structure arranged to support an additional overhead camera.

Thus the camera array is also arranged to capture one or more images of a roof of a vehicle passing through the vehicle imaging volume.

The skilled person will appreciate that the first and second aspects of the invention can be used in combination in a single vehicle imaging system.

BRIEF DESCRIPTION OF THE DRAWINGS

Embodiments of the invention will now be described with reference to the accompanying drawings, in which.

DETAILED DESCRIPTION

Figure 1:
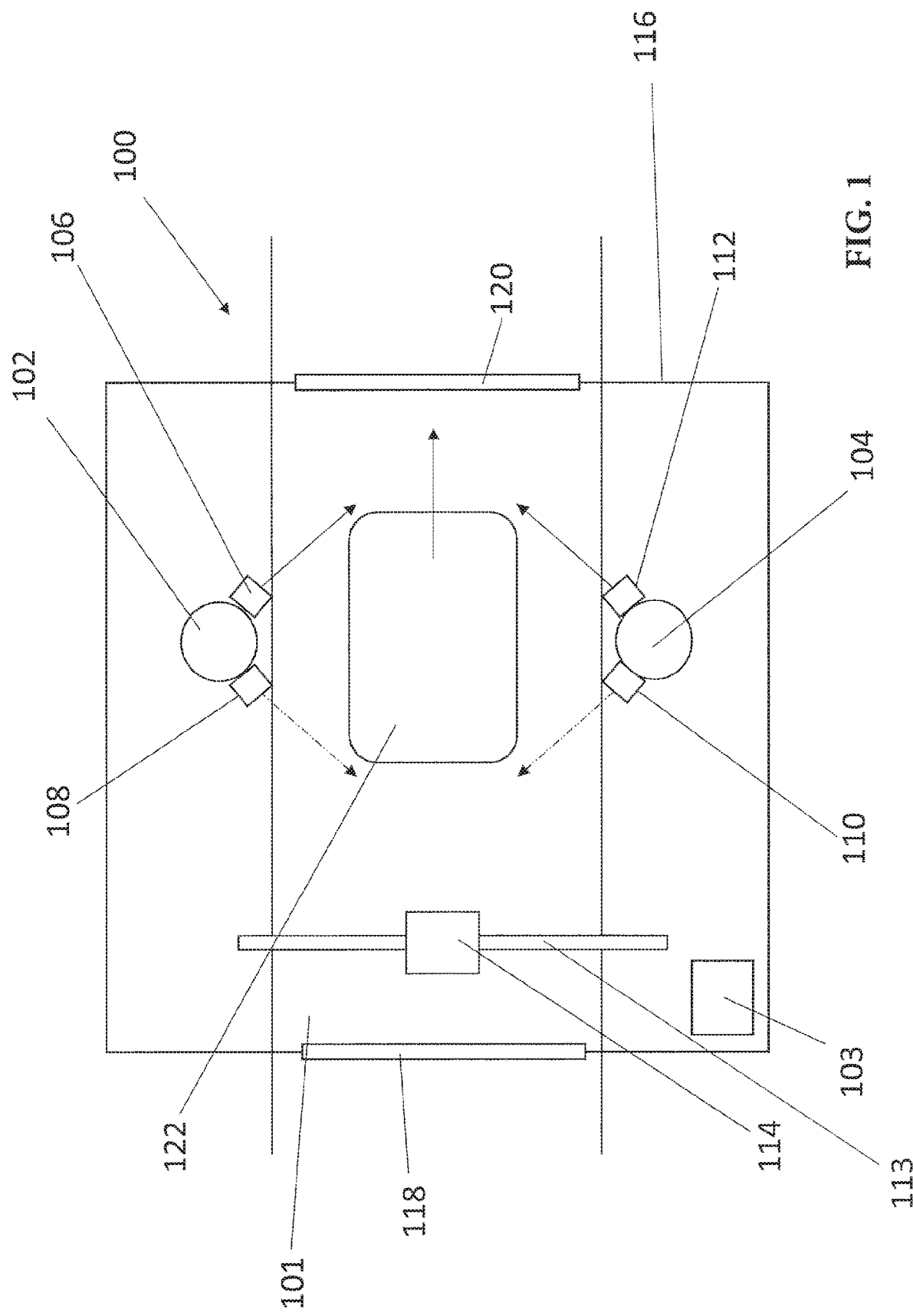
FIG. 1 is a schematic diagram of a vehicle imaging station according to an embodiment of the invention.

A vehicle imaging station according to an embodiment of the invention is shown generally at 100 in FIG. 1. The vehicle imaging station 100 is arranged around a roadway 101, which is a path suitable for a vehicle 122 to travel along. Cameras 106, 108, 110 and 112 are arranged at different points along the roadway, such that the fields of view of these cameras combine to cover or define a vehicle imaging volume.

A vehicle to be imaged 122 travels along the roadway and as it does so, vehicle speed detection device 114 measures the speed of the vehicle. Control unit 103 then adjusts the shutter speed of the cameras 106, 108, 110 and 112 based on the measured speed of the vehicle. Cameras 106, 108, 110 and 112 then capture images of the vehicle 122 as it passes through the vehicle imaging volume.

Vehicle imaging station 100 comprises a first support post 102 located on one side of a vehicle roadway and a second support post 104 located on an opposite side of the vehicle roadway.

A first camera 106 is located towards an upper end of the first support post 102 and is angled towards the exit of the vehicle imaging station 100 such that the first camera 106 can capture images of an upper part of a first side of a vehicle and the back of a vehicle as the vehicle moves through the vehicle imaging volume.

A second camera 108 is located towards a lower end of the first support post 102, and is angled towards the entrance of the vehicle imaging station such that the second camera 108 can capture images of the front of the vehicle and a lower part of the first side of the vehicle as the vehicle moves through the vehicle imaging volume.

A third camera 110 is located towards a lower end of the second support post 104 and is angled towards the entrance of the vehicle imaging station such that the third camera 110 can capture images of a lower part of a second side of a vehicle and the front of a vehicle as the vehicle moves through the vehicle imaging volume.

A fourth camera 112 is located towards an upper end of the second support post 104 and is angled towards the exit of the vehicle imaging station such that the fourth camera 112 can capture images of the back of the vehicle and an upper part of the second side of the vehicle as the vehicle moves through the vehicle imaging volume.

In the embodiment shown in FIG. 1, each of the first, second, third and fourth cameras 106, 108, 110, 112 have a horizontal orientation (i.e. parallel to the roadway 101). However, the skilled person will appreciate that the cameras could alternatively be angled with respect to the roadway in some embodiments.

Thus, the first 106, second 108, third 110 and fourth 112 cameras together make up a four part camera system arranged to capture multiple images of a vehicle as it passes through the vehicle imaging volume.

The vehicle imaging station may additionally include a support structure 113 arranged to support an additional camera (not shown) in an overhead position, i.e. located above the roadway and angled down towards the roadway such that it can capture images of a roof of a car passing through the vehicle imaging volume.

The vehicle imaging apparatus further includes a vehicle speed detection device 114. In the embodiment shown in FIG. 1, the vehicle speed detection device 114 is located on overhead support structure 113, but the skilled person will appreciate that the vehicle speed detection device could be located in any position that enables the speed of a vehicle passing through the vehicle imaging volume to be determined. For example, the vehicle speed detection device could be attached to one of the first or second support posts 102, 104.

In the embodiment shown in FIG. 1, the vehicle speed detection device comprises a laser based system such as a laser scanner. However, the skilled person will appreciate that any suitable speed detection device, for example a radar, infrared or sensors embedded in the roadway, could be used. The vehicle speed detection device 114 can detect not only the speed but also the position of the vehicle 122 along the roadway 101.

The vehicle imaging unit also comprises a control unit 103. The control unit can be, for example, a PC which can be connected with to the cameras 106, 108, 110, 112 and the speed detection device 114 by, for example, USB or Ethernet connections. The control unit is arranged to receive a detected speed measurement from the vehicle speed detection device 114 and then modify the shutter speed of each of the cameras of the four part camera system based on the detected vehicle speed.

For a fast moving vehicle, a low shutter speed would lead to a blurry image but using a fast shutter speed for a slow moving vehicle would lead to an unnecessarily high level of noise that would reduce the quality of the image.

The required shutter speed for a given camera is calculated from the detected vehicle speed by:

$$S \ge fV/DC$$

Where S is the required shutter speed, f is the focal length of the camera lens, V is the detected vehicle speed, D is the distance between the camera and the vehicle and C is the maximum acceptable distance moved on the image (i.e. the maximum acceptable blur).

In addition to adjusting the shutter speed of the cameras the control unit 103 may additionally adjust the ISO levels and/or the field of view of the cameras in response to lighting levels and to the adjusted shutter speed, in order to optimise and balance the captured images.

The vehicle speed detection device 114 can be arranged to detect the speed of the vehicle 122 at multiple points throughout the vehicle imaging volume. In some embodiments the vehicle speed detection device 114 is arranged to continuously monitor the speed of a vehicle 122 as it passes through the vehicle imaging volume and to continuously output this information to the control unit 103, which is arranged to continuously update the shutter speed of each of the four cameras 106, 108, 110, 112.

The first and second support posts may be arranged to house electronic storage means to store images captured by the cameras. Alternatively the cameras may be arranged to communicate with a cloud based storage system.

Optionally, the first and second support posts 102, 104 and the vehicle speed detection device 114 can be located within a booth 116. In some embodiments the cameras and the vehicle speed detection device may be mounted on the inside walls of the booth. In some embodiments the vehicle imaging station does not include a booth and cameras can simply be mounted on any suitable support structure near to the roadway 100.

The booth comprises an automatic entrance door 118 and an automatic exit door 120 arranged to be controlled by a door control system (not shown). In use, the door control system causes entrance door 118 to open to permit a vehicle 122 to enter the booth. Once the vehicle is inside the booth the door control system closes entrance door 118 (and also closes exit door 120, if it is not already closed). Once the required images have been captured by cameras 106, 108, 110, 112, the door control system causes exit door 120 to open to permit the vehicle to exit the booth.

Figure 2:
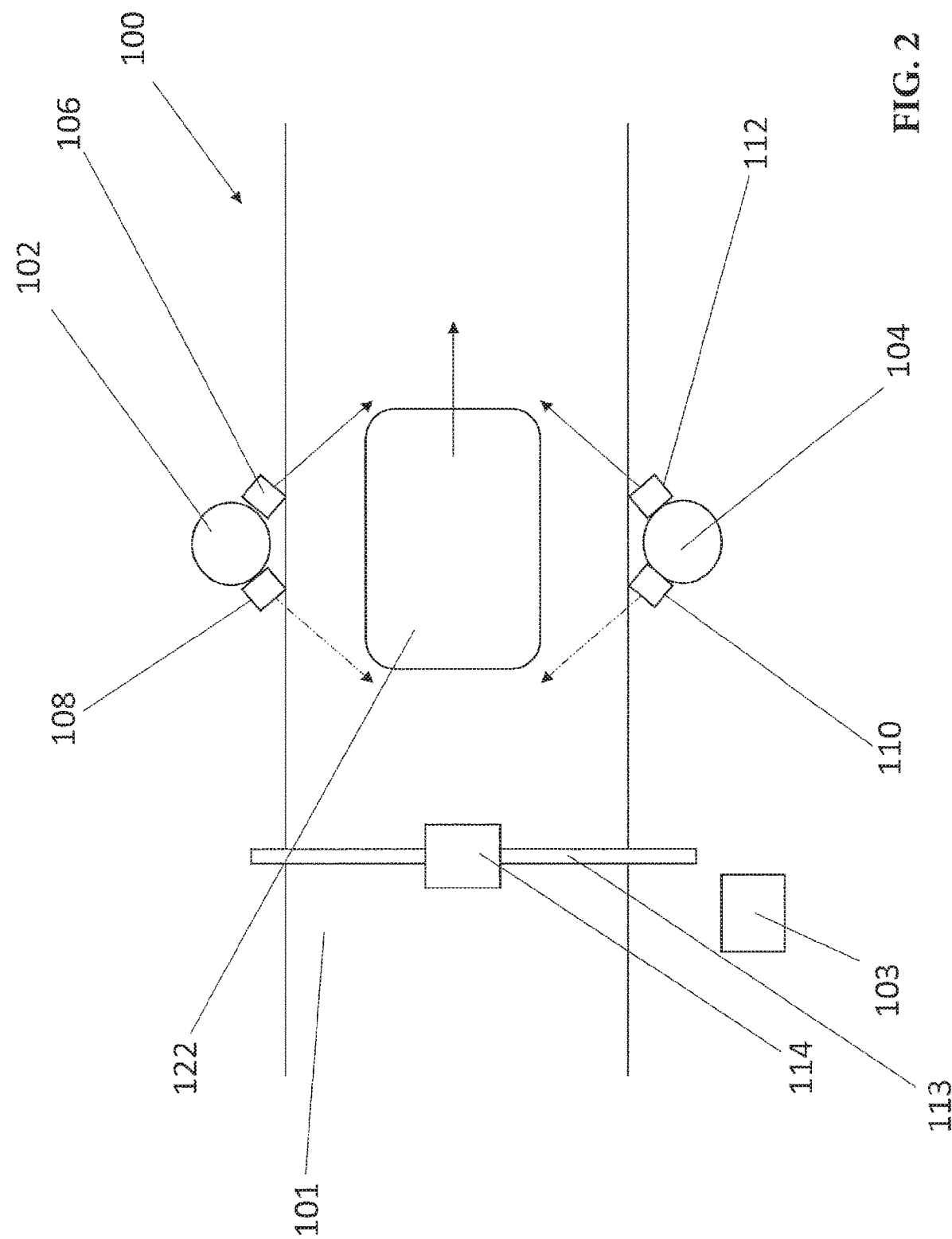
FIG. 2 is a schematic diagram of a vehicle imaging station according to an embodiment of the invention.

FIG. 2 shows a vehicle imaging station according to an embodiment of the invention. The vehicle imaging station of FIG. 2 is similar to the vehicle imaging station of FIG. 1 and like parts are numbered with the same reference numerals. In the embodiment shown in FIG. 2 however, the vehicle imaging station does not include a booth.

Figure 3:
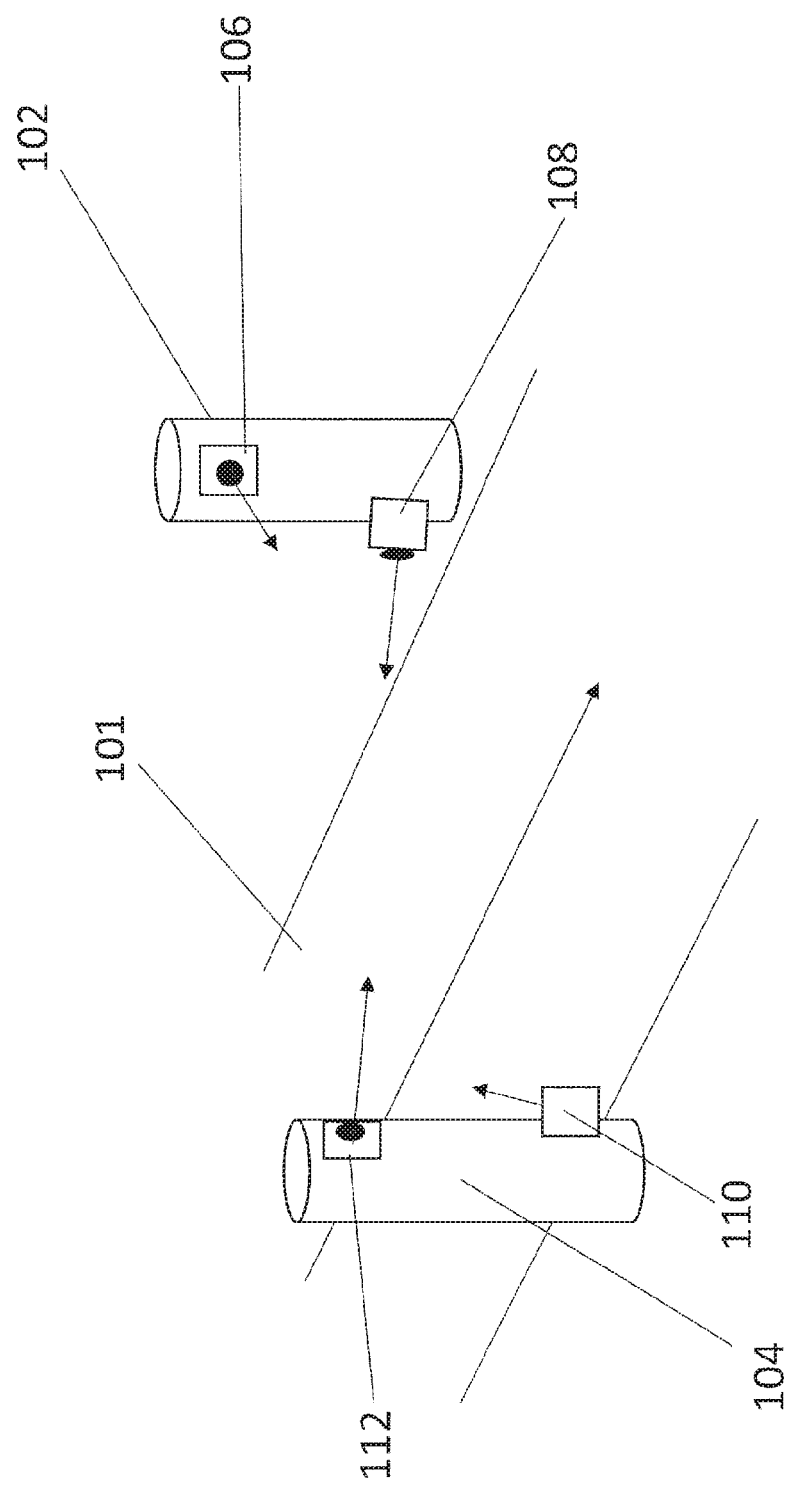
FIG. 3 is a schematic diagram of a camera array of the vehicle imaging station of FIG. 1.

FIG. 3 shows an isometric view of the camera array according to an embodiment of the second aspect of the invention, comprising the first and second support posts 102 and 104 of FIG. 1 and the first, second, third and fourth cameras 106, 108, 110, 122.

In use, as a vehicle approaches the first and second support posts 102, 104, a control unit 103 causes the second and third cameras 108, 110 to each capture an image of the front of the vehicle 122. As the vehicle moves between the support posts 102, 104, the control unit 103 causes all four cameras to capture one or more images of the sides of the vehicle 122. Then, as the vehicle 122 moves past the support posts 102, 104, the control unit 103 causes the first camera to capture one or more images of the top of the vehicle and an upper part of the back of the vehicle, and causes the fourth camera to capture one or more images of the lower part of the back of the vehicle.

Although, in the embodiment shown in FIG. 3 the camera array includes 4 cameras, it will be appreciated that some embodiments of the invention may include 5, 6 or more cameras. For example, the array could include a fifth camera located at a third height, greater than the first and second heights, for example for capturing images of taller vehicles such as vans. In addition/alternatively the array could include a sixth camera which could be, for example an overhead camera located on an overhead gantry such as overhead gantry 113 shown in FIGS. 1 and 2. In some embodiments, the camera array may include more than one overhead camera, arranged to capture different parts of a roof of a vehicle passing underneath.

Although the invention has been described above with reference to one or more preferred embodiments, it will be appreciated that various changes or modifications can be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A vehicle imaging station comprising a camera array for imaging a vehicle as it passes through a vehicle imaging volume, the vehicle imagining station comprising:
   one or more support structures;
   first and second cameras attached to the one or more support structures and located on a first side of the vehicle imaging volume, wherein the first camera is located at a first height and is angled to capture one or more images of a front of a vehicle as it enters the vehicle imaging volume, and wherein the second camera is located at a second height, greater than the first height and is angled to capture one or more images of a rear of a vehicle as it exits the vehicle imaging volume; and
   third and fourth cameras attached to the one or more support structures and located on a second side of the vehicle imaging volume, opposite to the first side, wherein the third camera is located at the first height and is angled to capture one or more images of the front of a vehicle as it enters the vehicle imaging volume and the fourth camera is located at the second height and is angled to capture one or more images of a rear of a vehicle as it exits the vehicle imaging volume.

2. A vehicle imaging station according to claim 1, further comprising a fifth camera located above the vehicle imaging volume, such that it is arranged to capture one or more images of a top side of a vehicle passing through the vehicle imaging volume.

3. A vehicle imaging station according to claim 1, wherein the vehicle imaging station includes a vehicle length and/or height detection device and the control unit can cause the cameras to adjust the number of images captured based on a detected length and/or height of the vehicle.

4. A vehicle imaging station according to claim 1, wherein the one or more cameras are mounted on one or more support posts.

5. A vehicle imaging station according to claim 1, further comprising a booth within which the one or more image capture devices are provided and which has an entrance and an exit for a vehicle.

6. A vehicle imaging station according to claim 5, wherein at least a portion of the walls of the booth may include a light absorption coating or an antireflection coating.

7. A vehicle imaging station according to claim 5, wherein the booth comprises automatic doors at each end, arranged to open to enable the vehicle to pass in to the booth, to close automatically once the vehicle has entered the booth and to open again to enable the vehicle to exit the booth.

8. A vehicle imaging station according to claim 1, further comprising a unique identifier capture system for capturing and processing one or more images of unique identifiers associated with vehicle being imaged by the apparatus.

9. A vehicle imaging station according to claim 1, wherein the first height is between 0.6 m and 1 m.

10. A vehicle imaging station according to claim 1, wherein the second height is between 1 m and 1.5 m.

* * * * *